United States Patent
Murphy

[15] 3,671,465
[45] June 20, 1972

[54] COMPOSITION AND PROCESS FOR STRIPPING PAINT

[72] Inventor: Donald P. Murphy, Roseville, Mich.
[73] Assignee: Hooker Chemical Corporation, Niagara Falls, N.Y.
[22] Filed: Oct. 1, 1968
[21] Appl. No.: 764,292

[52] U.S. Cl. ...................252/548, 134/38, 252/158, 252/171
[51] Int. Cl. .............................................C11d 7/06
[58] Field of Search.....................252/156, 152, DIG. 8, 171, 252/158; 134/38

[56] References Cited

UNITED STATES PATENTS

| | | | |
|---|---|---|---|
| 1,829,583 | 10/1931 | Davidson et al. | 252/153 |
| 2,915,444 | 12/1959 | Meyer | 252/156 X |
| 2,955,047 | 10/1960 | Terry | 106/3 |
| 2,922,995 | 7/1961 | Arden | 252/156 X |
| 3,179,609 | 4/1965 | Morison | 260/28 |
| 3,308,066 | 3/1967 | Murphy et al. | 252/156 X |
| 3,368,913 | 2/1968 | Ziehr et al. | 252/156 X |
| 3,417,025 | 12/1968 | Cooper et al. | 252/156 X |
| 2,750,343 | 6/1956 | Beber | 252/153 |

OTHER PUBLICATIONS

Union Carbide Bulletin, " Alkanolamines and Morpholines," Copyright 1960, pps. 6– 9
Gregory– Uses & Applications of Chemicals and Related Materials, June 1939, pps. 614– 615
Rose, The Condensed Chemical Dictionary, p. vi, 320 (1966).

*Primary Examiner*—Leon D. Rosdol
*Assistant Examiner*—Arnold I. Rady
*Attorney*—Stanley H. Liberstein and William J. Schromm

[57] ABSTRACT

An aqueous alkaline stripping solution which contains an accelerator composition comprised of tripropylene glycol and an organic nitrogen compound of the formula:

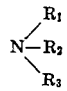

wherein $R_1$, $R_2$ and $R_3$ are independently selected from the group consisting of hydrogen, alkanol and hydroxy ether groups, which latter groups contain from about two to 10 carbon atoms, at least one of $R_1$, $R_2$ and $R_3$ being other than hydrogen, the compound having a boiling point of at least about 100° C and a molecular weight which is not substantially in excess of about 500. The preferred alkaline stripping solution is an aqueous sodium hydroxide solution and the preferred components of the activator composition are tripropylene glycol and triethanolamine.

7 Claims, No Drawings

COMPOSITION AND PROCESS FOR STRIPPING PAINT

This invention relates to a composition and method for removing protective coatings from substrates to which they have been applied and more particularly, it relates to an improved accelerator additive for increasing the effectiveness of an alkaline stripping composition.

Various organic siccative coatings, including paints, varnishes, lacquers, enamels, and the like, are commonly applied to various substrates to provide a protective and/or decorative coating. The coating compositions used are formulated from numerous and diverse components, including acrylic resins, epoxy resins, vinyl resins, alkyd resins, natural and synthetic rubber latexes and the like.

In some instances, due to defects in the coating applied, it may be desirable to remove these coatings, so that a new coating may be applied. Moreover, where the articles being coated are transported on a conveyor line, the hooks or supports which carry the articles, become coated with paint or other coating materials during the process. Since these hooks or hangers are repeatedly introduced into the coating zone, the coating material continues to build up on them, adding to the weight of the conveyor line and, frequently, filling in the hook, if the coating is not periodically removed. Additionally, in the production of natural and synthetic rubber latex compositions, deposits or coatings of these materials frequently build up on the walls of the polymerizer or reaction vessels, which deposits gradually increase in thickness and must ultimately be removed.

As the quality of these organic siccative coatings has improved it has become increasingly difficult to remove them from the surfaces to which they are applied. Frequently, it has been found that even when the coated surface is contacted with a boiling, alkaline stripping solution for an extended period of time, appreciable loosening of the coating on the surface may not be obtained. Additionally, under such drastic removal condition, the substrate itself may be attacked by the stripping composition.

It is, therefore, an object of the present invention to provide an improved alkaline stripping composition which is effective in removing various organic coatings from surfaces to which they have been applied.

Another object of the present invention is to provide an improved alkaline stripping composition which is effective in removing various types of organic coating materials in appreciably shorter periods of time than has heretofore been possible with prior alkaline stripping compositions.

A further object of the present invention is to provide an improved method for removing organic coating from surfaces to which they have been applied, without appreciable attack on the substrate.

These and other objects will become apparent to those skilled in the art from the description of the invention which follows.

Pursuant to the above objects, the present invention includes a concentrate composition, useful when admixed with water in forming an aqueous alkaline paint stripping composition, which concentrate comprises an alkali metal hydroxide, as the principal source of alkalinity, and an accelerating amount of an accelerator composition comprising tripropylene glycol and an organic nitrogen compound of the formula:

wherein $R_1$, $R_2$ and $R_3$ are independently selected from the group consisting of hydrogen, alkanol and hydroxy ether groups, which groups contain from about two to 10 carbon atoms, at least one of $R_1$, $R_2$ and $R_3$ being other than hydrogen, the compound having a boiling point of at least about 100° C and a molecular weight which is not substantially in excess of about 500. This composition, when admixed with water has been found to form a particularly effective solution for removing organic materials containing various resin components, such as acrylic, epoxy, vinyl, alkyd, natural and synthetic rubber latexes, and the like resin materials, from various substrates.

More specifically, the alkaline concentrate composition of the present invention contains an alkali metal hydroxide, as the principal source of alkalinity, in an amount of at least about 50 percent by weight of the concentrate composition. Desirably, the alkali metal hydroxide is present in this composition in an amount within the range of about 70 to 97 percent by weight of the concentrate composition.

Additionally, if desired, the concentrate composition may also contain other alkaline materials, in addition to the alkali metal hydroxide. Typical of such alkaline materials are the alkali metal carbonates, alkali metal silicates, alkali metal phosphates, and the like. Exemplary of the alkali metal silicates and alkali metal phosphates which may be used are the alkali metal orthosilicates, and metasilicates and the trialkalimetalphosphates, alkali metal pyrophosphates, alkali metal tripolyphosphates, and the like, respectively. Typically, these alkaline materials, other than the alkali metal hydroxides, may be present in the concentrate composition in amounts up to about 50 percent by weight of the composition, with amounts within the range of about 3 to 30 percent by weight of the composition being preferred. It is to be understood that the foregoing amounts refer to the total of the alkaline materials, other than alkali metal hydroxides, and that this total may be made up of one or more of these added alkaline materials.

It is to be appreciated, of course, that as used in the specification and claims, the term "alkali metal" is intended to refer to lithium, sodium, potassium, cessium and rubidium. In many instances, the preferred alkali metal has been found to be sodium, so that primary reference hereinafter will be made to the compounds of sodium. This is not, however, to be taken as a limitation of the present invention but merely as being exemplary thereof, since other alkali metal compounds, such as potassium compounds and the like, are also useful.

In addition to the above-indicated alkaline materials, the concentrate composition of the present invention also includes an accelerating amount of an accelerator composition. Desirably, the accelerating composition is present in the concentrate in an amount within the range of about 2 to 50 percent by weight of the concentrate, with amounts within the range of about 12 to 25 percent by weight being preferred. The accelerating composition is comprised of tripropylene glycol and an organic nitrogen containing compound. Desirably, the tripropylene glycol is present in the accelerator composition in an amount within the range of about 20 to 90% by weight and the organic nitrogen containing compound is present in an amount within the range of about 10 to 80% by weight of the accelerator composition. Preferably, the weight ratio of the tripropylene glycol to the organic nitrogen containing compound in the accelerator compositions is within the range of about 0.5 to 3 to 1.

The organic nitrogen compound component of the accelerating composition is a mono-, di-, or tri-alkanol or hydroxy ether amine, having the formula as has been set forth hereinabove. The organic nitrogen compounds used have a boiling point of at least about 100° C and a molecular weight which is not substantially in excess of about 500 and the alkanol and hydroxy ether groups thereof each contain from about two to 10 carbon atoms, with from about two to six carbon atoms being preferred. Exemplary of specific organic nitrogen compounds which may be used are monoisopropanol amine; monoethanolamine; diethanol-amine; triethanolamine; 2-amino-2-methyl-1-propanol; 2-amino-2-methyl-1,3-propanediol; 2-amino-2-ethyl-1,3-propanediol; diglycolamine; trihexanolamine; dioctanolamine; monodecanolamine; tributanolamine; dipentanolamine; tri(2[hydroxyethoxy]ethyl)amine; 4[6-hydroxy-hexoxy] butylamine; 6[4-hydroxybutoxy]hexylamine; 5[2-hydroxyethoxy]-pentylamine; 2-hydroxyethoxymethylamine; di(3[2-hydroxyethoxy]-propyl)amine; and the like.

It has been found that while the tripropylene glycol is by itself, somewhat effective as an accelerator additive for an alkaline stripping composition, the above described organic nitrogen compounds have substantially no accelerating effect on an alkaline stripping composition when used alone. Surprisingly, however, when these organic nitrogen compounds are combined with the tripropylene glycol, the combined materials give a stripping effectiveness to the alkaline stripping compositions to which they are added which is greatly enhanced over that obtained when using the tripropylene glycol alone.

In addition to the components indicated hereinabove, the concentrate composition of the present invention may also include a gluconic acid material. Such material is typically present in the composition in amounts up to about 10 percent by weight of the alkaline concentrate composition, with amounts within the range of about 2 to 7 percent by weight of the composition being preferred. It is to be understood that by the term "gluconic acid material" it is intended to refer to and include gluconic acid itself, water soluble and/or water dispersable forms of gluconic acid such as the alkali metal gluconates and in particular sodium gluconate, glucono-delta-lactone, and the like.

Surface active or wetting agents may also be included in the concentrate composition, in amounts up to about 10 percent by weight of the composition, with amounts within the range of about 0.1 to 7 percent by weight of the composition being preferred. Various suitable surface active agents of the anionic, nonionic and cationic types may be used, provided they are soluble and effective in the alkaline stripping solution. In many instances, excellent results have been obtained when using wetting or surface active agents of the phosphate ester type and accordingly, these materials are preferred. Additionally, sulfated fatty acid derivatives and sulfated fatty acid amid derivatives, as described in U.S. Pat. Nos. 2,528,378 and 2,773,068, as well as sulfated alcohols, such as the sodium sulfate derivatives of 2-ethylhexanol may also be used.

Other adjuvants which may be included in the concentrate compositions of the present invention include rinsing or dispersing agents, such as lignin sulfonates, as well as materials to impart a pleasant odor to the stripping composition, such as pine oil, and the like. Typically, these materials are present in the concentrate composition in amounts up to about 10 percent by weight of the composition.

In formulating aqueous alkaline stripping compositions, the alkaline concentrate composition, as heretofore described, is admixed with water in an amount sufficient to provide a stripping composition having the desired alkalinity to effect substantial loosening of the organic coating or film to which the stripping composition is applied. Typically, the aqueous alkaline stripping composition of the present invention will contain the concentrate composition in amounts within the range of about 0.5 to 5 pounds per gallon of solution, with amounts within the range of about 1 to 3 pounds per gallon being preferred. It is to be appreciated, that, if desired, the accelerating composition and the alkaline portion of the concentrate composition may be admixed separately with the water, rather than being added as a single composition. Where this is done, the alkaline portion of the concentrate composition is desirably admixed with water in an amount within the range of about 0.5 to 5 pound per gallon, while the accelerator composition is added in an amount within the range of about 0.5 to 20 percent by volume of the aqueous stripping composition. In a most preferred embodiment of the invention, the aqueous alkaline stripping solution will contain the alkaline components of the concentrate material in an amount within the range of about 1 to 3 pounds per gallon and the accelerator composition in an amount within the range of about 2 to 10 percent by volume of the stripping solution, the accelerating composition having a weight ratio of the tripropylene glycol to the organic nitrogen compound of about 0.5 to 3:1.

In utilizing the stripping compositions of the present invention, the aqueous alkaline stripping solution, formulated as has been indicated hereinabove, is brought into contact with the substrate from which it is desired to remove the organic coating, such as paint or other protective or decorative coatings. The contact time required to effect a substantial loosening of the coating from the substrate will, of course, depend upon the nature and thickness of the coating which is to be removed. In some instances, contact times of a few minutes, e.g. 2 to 3 minutes may be sufficient, while with other and more difficultly removable coatings, appreciably longer contact times, e.g., 30 minutes or more may be desirable. Accordingly, it is not possible to give specific contact times which are used, inasmuch as the contact times utilized will, in each instance, be that which will effect a substantial loosening of the coating on the surface.

In this respect, it is to be noted that it is not essential that the stripping solutions of the present invention remain in contact with the coated substrate for a period sufficient to effect complete removal of the coatings from the substrate. It is only necessary that the contact times be sufficient to effect a loosening of the organic coating or film on the substrate, so that it may then be removed by brushing, high pressure water spray, or the like.

Generally, it is desirable that the contact between the stripping solution and the substrate from which the coating is to be removed is effected by immersing the substrate in the stripping solution. In this manner, a thorough and continuous wetting of the substrate by the stripping solution is obtained with little or no loss of the stripping solution. In some instances, however, particularly when less difficultly removable films are involved, other contact techniques, such as spraying, flooding, or the like may be used.

Desirably, the stripping solution is at an elevated temperature when it is brought into contact with the substrate from which the protective film is to be removed. Preferably, the solution is at a temperature which is close to its boiling point, with temperatures within the range of about 90° to 100° centigrade being typical. It will be appreciated, however, that in many instances, either higher or lower temperatures, e.g. room temperature, may also be used.

Once the protective coating on the substrate has been substantially loosened by contact with the stripping solution and the coating has been removed from the substrate, either by retaining the stripping solution in contact with the coating until complete removal is obtained or by utilizing other removal techniques, on the loosely adhering coating, the substrate may then be recoated with a new protective coating. Generally, however, it is preferred that the surface first be water rinsed, so as to remove any of the alkaline stripping solution which may still be retained on the surface.

It has been found that by using the aqueous alkaline stripping solution described above, in the manner which has been indicated, greatly improved results are obtained in terms of reduction in the time required to effect a substantial loosening of many different types of protective and/or decorative coatings, including paints, lacquers, varnishes, enamels and the like. The present stripping solutions are particularly effective in removing protective and/or decorative films containing resins of the acrylic, alkyd, epoxy, vinyl and natural and synthetic rubber latex type. Moreover, the time required to effect substantially loosening of such films when using the present composition, are found to be appreciably less than the time required when using similar alkaline stripping solutions, but without the activator composition of the present invention or which contain only one of the components of the present activator composition.

In order that those skilled in the art may better understand the present invention and the manner in which it may be practiced, the following specific examples are given. It is to be understood, however, that these examples are merely exemplary of the compositions and processes of the present invention and are not to be taken as a limitation thereof. In these examples, unless otherwise indicated, temperatures are in degrees centigrade and parts and percents are by weight.

In the following examples, an acrylic paint was applied over a conventional iron phosphate paint base coating on one inch by four inch steel panels, the paint having a thickness of 1.3 mils.

An alkaline stripping solution was formulated by dissolving sodium hydroxide in water in an amount of 1.5 pounds per gallon. Various accelerator compounds or compositions were incorporated in this alkaline solution in an amount of 5 percent by volume of the solution. The painted panels were immersed in the stripping solutions and retained there until there was a substantially complete removal of the paint film from the panel. The stripping solutions were maintained at a temperature of 100° centigrade during the time the panels were immersed therein. Using this procedure, the following results were obtained, wherein, for convenience, the tripropylene glycol is referred to as "TPG":

| Ex. | Accelerator | Mole ratio of accelerator components | Stripping time (minutes) |
| --- | --- | --- | --- |
| 1 | tripropylene glycol (TPG) | — | 15.3 |
| 2 | monoethanolamine | — | no effect in 30 min. |
| 3 | TPG + monoethanolamine | 1:2 | 13.42 |
| 4 | diethanolamine | — | no effect in 30 min. |
| 5 | TPG + diethanolamine | 3:2 | 12.66 |
| 6 | triethanolamine | — | no effect in 30 min. |
| 7 | TPG + triethanolamine | 3:2 | 9.25 |
| 8 | "Diglycolamine" (trademark for 2-(2-aminoethoxy)-ethanol) | — | no effect in 30 min. |
| 9 | TPG + Diglycolamine | 3:2 | 5.67 |
| 10 | 2-amino-2-methyl-1-propanol | — | no effect in 30 min. |
| 11 | TPG + 2-amino-2-methyl-1-propanol | 1:1 | 12.60 |
| 12 | 2-amino-2-methyl-1,3-propanediol | — | no effect in 30 min. |
| 13 | TPG + 2-amino-2-methyl-1,3-propanediol | 3:2 | 13.18 |
| 14 | 2-amino-2-ethyl-1,3-propanediol | — | no effect in 30 min. |
| 15 | TPG + 2-amino-2-ethyl-1,3-propanediol | 3:2 | 14.25 |
| 16 | monoisopropanolamine | — | no effect in 30 min. |
| 17 | TPG + monoisopropanolamine | 1:2 | 10.58 |

While there have been described various embodiments of the invention, the compositions and methods described are not intended to be understood as limiting the scope of the invention as changes therein are possible and it is intended that each element recited in any of the following claims is to be understood as referring to all equivalent for accomplishing substantially the same results in substantially the same or equivalent manner, it being intended to cover the invention broadly in whatever form its principal may be utilized.

What is claimed is:

1. A concentrate composition, useful when admixed with water in forming an aqueous alkaline stripping composition which concentrate consists essentially of from about 50 to 98 percent by weight of an alkali metal hydroxide, as the principal source of alkalinity, and from about 2 to 50 percent by weight of an accelerator composition consisting essentially of from about 20 to 90 percent by weight of tripropylene glycol and from about 10 to 80 percent by weight of an organic nitrogen compound independently selected from the group consisting of mono ethanol amine, diethanol amine, triethanol amine, 2-(2-aminoethoxy)-ethanol, 2-amino-2-methyl-1-propanol, 2-amino-2-methyl-1,3-propane diol, 2-amino-2-ethyl-1,3-propane diol and mono isopropanol amine.

2. The composition as claimed in claim 1 wherein the tripropylene glycol and the organic nitrogen compound are present in the accelerator composition in the weight ratio of from about 0.5 to 3:1.

3. The composition as claimed in claim 2 wherein the organic nitrogen compound is triethanolamine.

4. An aqueous composition for removing organic coatings which comprises an aqueous solution of the concentrate composition as claimed in claim 1, which concentrate composition is present in an amount within the range of about 0.5 to 5 pounds per gallon of the aqueous composition.

5. The aqueous composition as claimed in claim 4 wherein the organic nitrogen compound is triethanolamine, and the weight ratio of the tripropylene glycol and organic nitrogen compound in the accelerator composition is within the range of about 0.5 to 3:1.

6. A method of removing organic coatings from a substrate which comprises contacting the substrate from which the coating is to be removed with the aqueous coating removing composition as claimed in claim 4 and maintaining the aqueous composition in contact with the surface for a period sufficient to effect a substantial loosening of the organic coating on the surface.

7. A method for removing organic coatings from a substrate which comprises contacting the substrate from which the coating is to be removed with the aqueous coating removing composition as claimed in claim 5 and maintaining the aqueous composition in contact with the substrate for a period sufficient to effect a substantial loosening of the coating on the substrate.

* * * * *